Dec. 15, 1970  F. R. McFARLAND  3,546,767
TOOL FOR REMOVING AND REPLACING SPRINGS AND WASHERS
Filed April 4, 1968  2 Sheets-Sheet 1

INVENTOR.
Frederick R. McFarland
BY
Paul & Paul
ATTORNEYS.

Dec. 15, 1970   F. R. McFARLAND   3,546,767
TOOL FOR REMOVING AND REPLACING SPRINGS AND WASHERS
Filed April 4, 1968   2 Sheets-Sheet 2
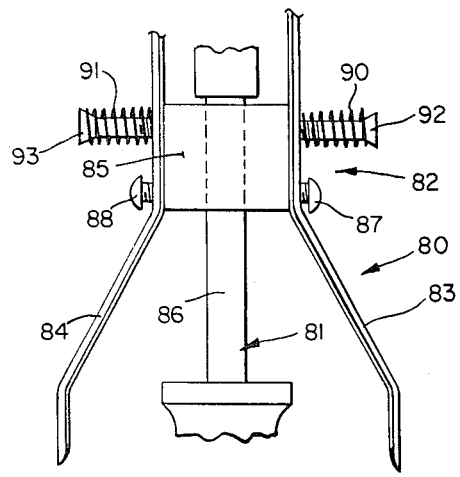
Fig. 8
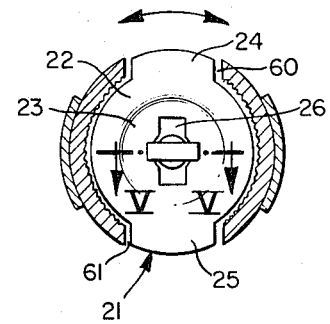
Fig. 4
Fig. 5
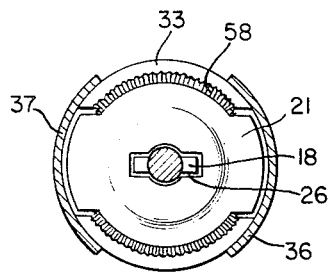
Fig. 6
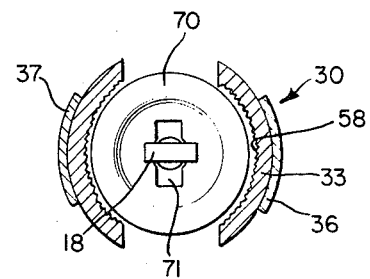
Fig. 7
INVENTOR.
Frederick R. McFarland
BY
Paul & Paul
ATTORNEYS.

United States Patent Office 3,546,767
Patented Dec. 15, 1970

3,546,767
TOOL FOR REMOVING AND REPLACING SPRINGS AND WASHERS
Frederick R. McFarland, Lancaster, Pa., assignor to K-D Manufacturing Company, Lancaster, Pa., a corporation of Pennsylvania
Filed Apr. 4, 1968, Ser. No. 718,746
Int. Cl. B23p 19/04
U.S. Cl. 29—227                                10 Claims

ABSTRACT OF THE DISCLOSURE

A tool is provided, particularly adapted for removing and installing springs and washers which maintain brake shoes in engagement against brake drums. The tool is hand actuated and includes a socket for engaging a washer or cap at the end of a compression spring, the tool also having opposed spring-biased levers which engage behind an opposite end of the compression spring, the washer-engaging socket being then movable longitudinally of the lever members for compressing the spring, during rotation of the socket member, for releasing the spring washer or cap from its spring pin.

BACKGROUND OF THE INVENTION

In many industries it has been desirable to release washers which abut against the end of compression springs from spring pins by utilizing a specialized tool. In particular, in the automotive industry such a practice has become conventional with respect to removal of and replacement of brake shoes, such brake shoe replacement often being necessary several times during the life of an automobile.

Brake shoes are conventionally attached to brake drums by means of a spring pin extending through the brake drum, and protruding outwardly, having an enlarged outer end which is engageable with a spring washer or cap, but which may be disengaged therefrom upon rotation of the washer or cap a given amount, generally 90°, until the outermost end of the pin is so aligned with respect to an opening in the washer or cap that it may be freely removed axially therefrom. It is generally necessary to compress the spring which is disposed about the spring pin an amount sufficient to permit rotation of the washer or cap relative to the spring pin.

Some of the prior art devices have utilized a manually actuable socket which engages over the washer or cap and which can be rotated after exerting a compressive force against the spring, such rotation being an amount sufficient to clear the cap from the end of the spring pin.

Other prior art devices are similarly operative for compressing springs and releasing the spring retaining washers, but utilize a pliers type tool for engaging the edges of the washers.

All of such prior art types of washer removal tools have been deficient in that they have not provided a means for removing the spring as well, thereby resulting in a situation whereby, when it was necessary to remove or replace brake shoes, the springs, after removal of the washers, often upon suddenly being released of compression, would "spring" from their position about the spring pin and become lost. It is thus readily apparent that prior art types of tools for removing washers at the end of compression springs disposed about spring pins have been unsatisfactory, in that the use of such tools has often resulted in lost springs, thereby retarding working efficiency of mechanics and assemblers.

SUMMARY OF THE INVENTION

The present invention eliminates the disadvantages of prior art types of tools adapted for the above-described purposes, in providing a tool which will engage the washer or cap in socket-like fashion, but having spring-biased lever members, each having a free end for engaging behind the compression spring associated with the washer or cap, whereby, after rotation of the washer an amount, sufficient to clear the outer end of the spring pin, the compression spring and washer may be removed from the spring pin as a unit, with the spring and washer confined within the tool.

Accordingly, it is a primary object of this invention to provide a novel tool for removing washers and associated compression springs from spring pins, as a unit.

It is another object of this invention to accomplish the above object, wherein opposed lever members are spring-biased toward positions for providing a spring-housing chamber, but wherein a washer-engaging socket is movable relative to those members which engage the washer, for compressing the spring prior to removal thereof.

It is a further object of this invention to provide a tool having a socket at one end, the tool also carrying at least one spring-biased lever member having an inwardly bent the free end, the socket being movable longitudinally and rotationally relative to the inwardly bent free end.

It is another object of this invention to provide a tool for removing springs and end washers or caps which are in engagement against springs, wherein a socket is provided for receiving either a spring end or a washer or cap which is engaged thereagainst, wherein means are provided for engaging against a remote end of a spring which is to be removed, the latter means being spaced from the socket for cooperating with the socket to compress a spring engaged therebetween, and facilitate the removal thereof.

Other objects and advantages of the present invention will become readily apparent to one skilled in the art upon a detailed reading of the following brief descriptions of the figures, detailed descriptions of the embodiments illustrated in the drawings, and the operation thereof, and the appended claims.

In the drawings:

FIG. 1 is a top view of the tool of this invention, illustrated with the spring-engaging levers thereof in engagement behind a compression spring carried by a brake shoe spring pin, and with a washer-engaging socket in a non-engaged position relative to the washer or cap at the outside end of the compression spring, and with an open position of the spring-engaging lever members being illustrated in phantom.

FIG. 2 is a fragmentary longitudinal sectional view of several of the elements illustrated in FIG. 1, but wherein the socket is illustrated in engagement with the washer at the outside end of the compression spring, with the compression spring in a compressed condition, after the socket has been rotated approximately 90°, to rotate the washer to a position in which its slot is aligned with the outside end of the spring pin for removal thereof.

FIG. 4 is an enlarged transverse sectional view through the tool of FIG. 1 of this invention, taken generally along the line IV—IV of FIG. 1, wherein the outer end of the spring pin is shown in locked engagement with the adjacent washer at the end of the compression spring, prior to rotation of the washer relative to the spring pin.

FIG. 5 is a further enlarged fragmentary sectional view through the washer at the end of the compression spring, as shown in FIG. 1, illustrating the normal interlocked position of the washer and the outer end of the spring pin, taken generally along the line V—V of FIG. 4.

FIG. 6 is an enlarged transverse sectional view taken through the tool of this invention, in its stage of operation as illustrated in FIG. 2, taken generally along the line VI—VI of FIG. 2, and wherein the relative alignment of the outer end of the spring pin and washer slot is clearly illustrated.

FIG. 7 is a view generally similar to that of FIG. 4, but illustrating an alternative type of spring-engaging washer, of the "earless" type.

FIG. 8 is a modified form of the tool of FIG. 1, wherein an alternative spring arrangement is provided for biasing the opposed lever members together.

Figure 1:
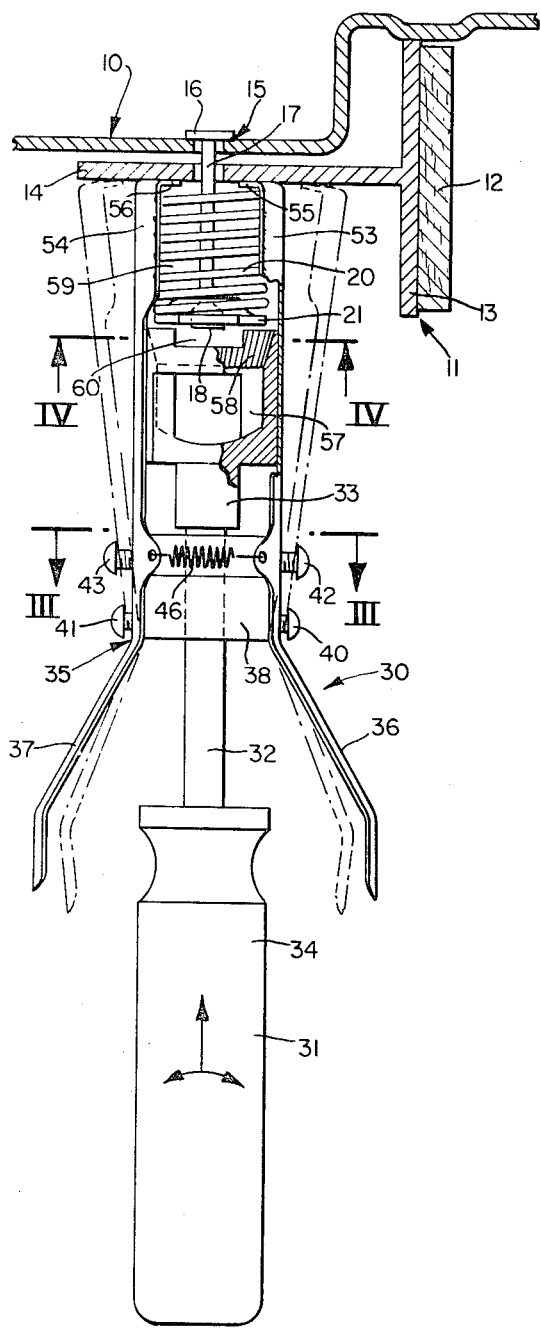

Referring now to the drawings now in detail, reference is first made to FIG. 1, wherein there is illustrated a portion of a brake backing plate 10, a brake shoe 11 having a lining 12, flange 13 and web 14, a spring pin 15 having a head 16 in engagement against the backing plate 10, and having a shank 17 extending through holes in the backing plate 10 and brake shoe web 14, with the pin 15 terminating in an outer-most flattened portion 18 of greater width than the shank 17.

A compression type hold-down spring 20 is disposed against the brake shoe web 14, about the pin 15, with the outer-most end of the spring 20 being in engagement against a spring washer or cap 21. The spring washer or cap 21 includes an outer flange 22, and an inwardly extending recess portion 23, with the outer-most end of the spring 20 in engagement against the flange 22 of the washer 21, about the recess portion 23. The washer 21 normally has opposed ears 24 and 25 for engagement by the socket end of the tool, in a manner later to be described.

A generally rectangularly configured slotted hole 26 is cut centrally within the inwardly recessed portion 23 of the washer 21, to provide clearance therethrough of the flattened portion 18 of the shank 17 of the spring pin 15. With particular reference to FIGS. 4 and 5, the longer sides of the slotted hole 26 are illustrated as having slight detents 27 and 28, disposed opposite to one another, to provide a seat for the flattened portion 18 of the shank 17 of the spring pin 15, for preventing accidental rotation of the washer 21 relative to the spring pin 15, during the normal assembled condition of the brake shoe 11 against the brake backing plate 10. It will be readily apparent that the compression spring 20, with an inner end in engagement against the brake shoe web 14 and its outer end in engagement against the flange 22 of the washer 21, provides the force which urges the washer 21 toward the flattened portion 18 of the pin 15, for maintaining the detents 27 and 28 in engagement against opposite widened sides of the flattened portion 18 of the pin 15. The washer 21 can thus not be accidentally rotated, without also moving the washer 21 axially inwardly relative to the pin 15, against the compressive force of the spring 20.

Also, in FIG. 1, there is illustrated the tool of this invention, generally designated by the numeral 30, in engagement with the spring 20, preparatory to removing the spring 20 and washer 21 from their respective positions of engagement against the web 14 and flattened portion 18 of the pin 15.

The tool 30 includes a manually graspable handle portion 31, a shank 32, and a socket member 33 carried at the opposite end of the shank 32 from the handle portion 31. The handle portion 31, shank 32 and socket 33 together comprise one major portion of the tool 30 of this invention, which is generally similar to a screwdriver construction, except for the socket 33 at the working end thereof.

A pliers-like member, generally designated by the numeral 35 is carried by the driver-like member 34, the pliers member including opposed lever members 36 and 37, carried by a base member 38.

The base member 38 is longitudinally movable along the shank 32, between the socket member 33 and handle portion 31, and is also freely rotatable about the shank 32. A pair of pivot pins 40 and 41 extend through clearance holes centrally located in respective lever members 36 and 37, and are retained within the base member 38, in press-fit relation.

Just above the pivot pins 40 and 41, are a pair of guide pins 42 and 43, also carried by the base member 38, in press-fit relation, and also extending through clearance holes in the lever members 36 and 37, respectively, with the pins 42 and 43 performing guiding functions, as the respectively associated lever members 36 and 37 are pivoted on their associated respective pins 40 and 41, with the heads of the pins 42 and 43 limiting the outward pivotal motion of the upper ends of the lever members 36 and 37, as viewed in FIG. 1, between the full line positions of the lever members illustrated, and the phantom line positions illustrated. The lever member 36 is provided with a pair of ears 44 and 45, disposed adjacent the pin 42, with the ears 44 and 45 each having holes therein for receiving associated ends of extension springs 46 and 47. Similarly the lever member 37 is provided with ears 48 and 50 adjacent the pin 43, the ears 48 and 50 having holes therein for receiving opposite ends of the springs 46 and 47. The springs 46 and 47 are provided in clearance notches 51 and 52, respectively, in the boss 38, for substantially housing the springs 46 and 47, thereby resulting in a neat and compact unit, with the springs 46 and 47 providing the biasing force for urging the upper ends of lever members 36 and 37 toward one another in their closed positions illustrated in full lines in FIG. 1.

The upper ends of the lever members 36 and 37 comprise opposed arcuate portions 53 and 54, which cooperate in their closed positions illustrated in the full lines in FIG. 1 to define a generally cylindrical chamber 59 therein, the chamber 59 generally conforming to the size of the spring 20. The end-most portions of the respective lever member portions 53 and 54 are inwardly bent as 55 and 56, which define end wall portions at one end of the chamber 59, when the lever members 36 and 37 are in their closed positions.

The socket member 33 at the upper end of the driver-like member 34 is provided with a generally cylindrical chamber 57, the upper-most inner end of which has a frusto-conically opening ribbed or toothed inner surface 58, for engaging against and transmitting rotational friction to edges of washers 21, during use. Also, a pair of opposed cut-outs 60 and 61 are provided in the upper-most end of the socket member 33, traversing the frusto-conical toothed interior surface portion 58 and extending through the walls thereof, to provide recesses for receiving the outwardly protruding ears 24 and 25, respectively, of the washer 21, and for transmitting driving rotation to the washer 21 from the socket member 33.

Figure 2:
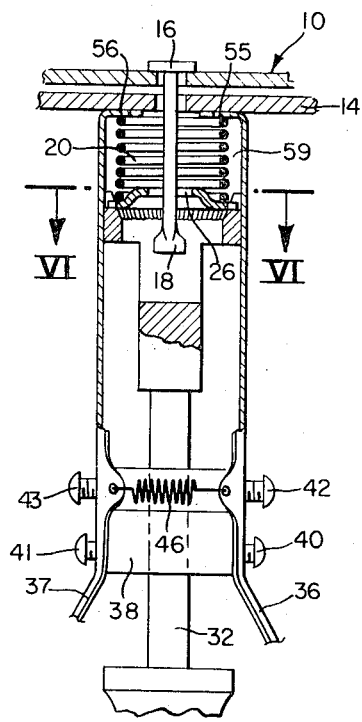
Figure 3:
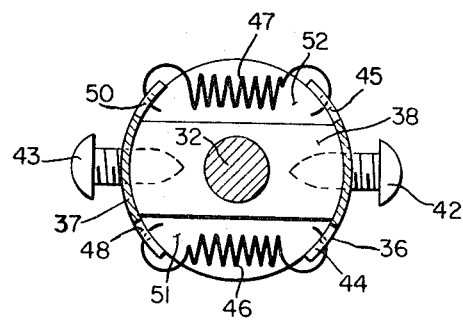
FIG. 3 is an enlarged transverse sectional view through the tool of this invention taken generally along the line III—III of FIG. 1, and wherein the means for spring-biasing the opposed lever members is clearly illustrated, along with the guiding means therefor.

With particular reference to FIGS. 2 and 6, it is seen that the tool 30 of this invention is operated by grasping the lever members 36 and 37 to spread their respective upper portions 53 and 54 such that the inwardly bent ends 55 and 56 of the lever members may engage the end of the spring 20, between the spring 20 and brake shoe web portion 14. The lever member 36 and 37 are then allowed to return to their normal positions, as illustrated in FIG. 2, or in full lines in FIG. 1, with the spring 20 in confined relation within the chamber 59 between the lever members. The driver portion 31 is then moved axially toward the washer 21, with the recesses 60 and 61 aligned with the ears 24 and 25 of the washer 21, until the ears 24 and 25 are engaged within respective recesses 60 and 61. Further movement of the handle portion 31 will urge the socket member 33 into positive engagement with the washer 21, with the toothed frusto-conical surface 58 thereof in wedged frictional engagement against the outer edge of the flange portion 22 of the washer 21.

The handle portion 31 of the driver member 34 is then rotated approximately 90°, thereby rotating the washer 21 approximately 90°, until the flattened portion 18 of the spring pin 15 is aligned with the slotted hole 26 of the washer 21, in the manner illustrated in FIG. 6. Concurrently with the above-mentioned 90° rotation of the driver member 34, the driver member 34 is urged axially toward the web portion 14 of the brake shoe 11, an amount sufficient to compress the spring 20 and move the washer 21 along the shank 17 of the spring pin 15, to enable the washer detents 27 and 28 to release their spring-biased engagement against the flattened portion 18 of the spring pin 15, such that the washer 21 will be moved vertically upwardly, relative to the flattened spring pin portion 18, from their relative positions illustrated in FIG. 5.

With the flattened portion 18 of the spring pin 15 aligned with the slotted hole 26 of the washer 21, the driver member 34 may then be moved directly outwardly away from the web 14 of the brake shoe 11, to allow the washer 21 to pass over the flattened end portion 18 of the spring pin 15, and with the driver member 34 carrying the pliers-like member 35 also in a direction away from the brake shoe rib 14, such that the spring 21 is also carried over the end 18 of the spring pin 15, confined at its ends by the inturned ends 55 and 56 of the lever members 36 and 37, and by the socket member 33.

Thus, the spring 20 and washer 21 are removed in unitary fashion from the spring pin 15 thereby precluding the possibility of spring misplacement and accidental loss.

To assemble the spring 20 and washer 21 onto the spring pin 15, after replacement of the brake shoe 11, the reverse of the above procedure is followed, in that a force is exerted on the handle portion 31 of the driver member 34, after the spring 20 has been applied over the spring pin 15, and the spring 20 is thereby compressed axiallly, with the driver member 34 being rotated until the flattened portion 18 of the spring pin 15 and the slotted hole 26 of the washer 21 are aligned. Then, the washer 21 is pushed over the flattened portion 18 of the spring pin 15, and upon rotation of the driver 34 through an arc of approximately 90°, the washer 21 will be rotated to enable the washer 21 and the flattened portion 18 of the spring pin 15 assume their respective relative positions illustrated in FIG. 5.

In FIG. 7 of the drawings, there is illustrated a cross-sectional view of the tool 30 of this invention, having a toothed surface 58 on the socket member 33, and opposite lever members 36 and 37, but wherein an alternative embodiment of a washer 70 is illustrated, operable upon removal in substantially the same way as the washer 21 illustrated in FIG. 4, but wherein the washer 70 is not provided with opposed ears for facilitating the rotation thereof. When the tool 30 is used with a washer such as that 70 of FIG. 7, the rotation of the washer 70 is effected by the frictional drive of the toothed surface portions 58 of the tool 30 engaging the circumferential area of the washer 70 under the axial force applied by the mechanic exerting sufficient force on the handle portion 31 of the tool 30 to compress the spring 21. Upon exerting such force, and rotating the driver member 34, the slotted hole 71 of the washer 70 will become aligned with the flattened portion 18 of the spring pin 51, in substantially the same manner as is described above.

With reference to FIG. 8, there is illustrated an alternative embodiment of the tool of this invention, generally designated by the numeral 80, comprising a driver member 81, and a pliers-like member 82. The pliers-like member comprises opposed lever members 83 and 84, carried by a base member 85, the base member 85 also being slidable along a shank 86 of the driver member 81, as well as rotatable thereabout. The lower ends of the opposed lever members 83 and 84 are movable toward one another, pivoting about pivot pins 87 and 88, carried by the base member 85, in the same manner as the tool 30 of FIG. 1.

The tool of FIG. 8 differs from the tool of FIG. 1, in the means for providing the biasing force for urging the upper-most ends of the lever member 83 and 84, as illustrated in FIG. 8, together, in that compression springs 90 and 91 are provided for urging the upper ends of the lever members 83 and 84 together, mounted on their respective associated guide pins 92 and 93. The remaining structural details and operation of the tool 80 is otherwise similar to that of the tool 30.

It is thus seen that the tool of this invention provides a novel means for increasing the efficiency of a brake shoe removal or replacement operation, in removing both the compression spring and cap or washer from the outwardly protruding spring pin, in a single removal operation.

It is to be understood that various structural details of the invention may be changed, as well as the assembly procedure outlined above, and the operation of the tool of this invention, without departing from the spirit and scope of the invention as defined in the appended claims.

I claim:

1. A tool for removing springs and spring end elements comprising a first member having socket means at one end thereof for receiving a spring end element therein, means carried by said socket means for securely gripping a spring end element and transmitting rotational driving forces to the spring end element disposed within said socket means, manually engageable means carried by said first member for providing rotational drive to said socket means, and independently actuable spring back-up means for engaging a spring portion spaced from said socket means and for cooperating with said socket means to compress a spring portion engaged therebetween.

2. The tool defined in claim 1, wherein said tool is adapted for use with a cylindrically wound spring, and said socket means and back-up means are freely axially slideable relative to one another, when the back-up means is in engagement with a said spring portion.

3. The tool defined in claim 2, wherein said back-up means are movable transversely of said slideable axial movement, realtive to said socket means to engage a spaced spring portion.

4. The tool defined in claim 3, wherein said back-up means comprise a pair of opposed spaced partially cylindrical portions each having a transversely extending end portion, including spring means for urging said end portions toward each other.

5. The tool defined in claim 2, wherein said back-up means and said socket means are configured for housing a cylindrical wound spring therein, and wherein said socket means is rotatable relative to and independent of any movement of said back-up means when said back-up means is in engagement with a said spring portion.

6. A tool having a shank, a handle at one end of said shank, a socket carried at an opposite end of said shank, a sleeve axially slideable on said shank, a pair of levers carried by said sleeve and extending axially of said shank beyond said socket, said levers each having end portions extending transversely inwardly of the tool, and being mounted to be pivotally movable toward each other in their normal operation independently of any movement of said socket, said socket, levers and lever end portions defining a generally cylindrical chamber of varying length.

7. The tool defined in claim 6, including spring means normally urging said levers toward cylindrical chamber configuration with said levers being actuable against the forces of said spring means to move the inwardly extending end portions away from each other.

8. The tool defined in claim 6, wherein guide means are provided independently of said pivotal mountings for controlling the pivotal movement of said levers.

9. The tool defined in claim 7, wherein said spring means comprise extension springs connecting adjacent sides of opposing levers across said sleeve.

10. A tool for facilitating the installation and removal of springs and associated members comprising a first screw-driver-like member having a socket end thereon configured for gripping and rotatably driving one of said springs and associated members and a second pliers-like member having opposite levers spring-urged together, said second member being carried by and axially slideable along said first member and wherein said socket end and adjacent ends of said levers are rotatable relative to one another and define a spring-receiving chamber therebetween, said chamber having sidewall portions and opposing end wall portions.

References Cited
UNITED STATES PATENTS

| | | | |
|---|---|---|---|
| 1,456,796 | 5/1923 | Gross | 29—227 |
| 2,394,562 | 2/1946 | Plumley | 29—278 X |
| 3,049,798 | 8/1962 | Denis | 29—227 |
| 3,355,791 | 12/1967 | Castoe | 29—227 |

FOREIGN PATENTS

| | | |
|---|---|---|
| 25,908 | 3/1923 | France. |

ROBERT C. RIORDON, Primary Examiner

J. C. PETERS, Assistant Examiner